United States Patent [19]

Munekata et al.

[11] Patent Number: 4,530,046
[45] Date of Patent: Jul. 16, 1985

[54] METHOD OF INPUTTING MACHINING INFORMATION TO A MACHINE TOOL NUMERICAL CONTROLLER AND APPARATUS THEREFOR

[75] Inventors: Kenichi Munekata, Kariya; Isao Suzuki, Okazaki; Tetsuro Yamakage, Anjoh, all of Japan

[73] Assignee: Toyoda Koki Kabushiki Kaisha, Kariya, Japan

[21] Appl. No.: 476,142

[22] Filed: Mar. 17, 1983

[30] Foreign Application Priority Data

Mar. 23, 1982 [JP] Japan .................... 57-45944

[51] Int. Cl.³ ........................... G06F 15/46
[52] U.S. Cl. ................... 364/191; 318/568; 340/724; 340/734; 364/171; 364/474
[58] Field of Search ............... 364/474, 475, 167-171, 364/188, 189, 191-193, 512; 318/568; 340/705, 721, 723, 724, 734, 745

[56] References Cited

U.S. PATENT DOCUMENTS

| | | | |
|---|---|---|---|
| 3,534,396 | 10/1970 | Hart et al. | 364/474 |
| 3,828,318 | 8/1974 | Bennett et al. | 364/171 X |
| 4,010,356 | 3/1977 | Evans et al. | 364/474 X |
| 4,317,114 | 2/1982 | Walker | 340/734 X |
| 4,437,150 | 3/1984 | Dahlgren, Jr. et al. | 364/171 X |

FOREIGN PATENT DOCUMENTS 0044192 1/1982 European Pat. Off. ........... 364/474

Primary Examiner—Joseph Ruggiero
Attorney, Agent, or Firm—Oblon, Fisher, Spivak, McClelland & Maier

[57] ABSTRACT

A numerical controller for a machining center comprising a microprocessor, which selectively executes an automatic programming function and a numerical control function. The microprocessor selectively displays on a CRT display unit various information which instructs an operator to input machining information regarding the blank and finished shapes of a workpiece and the mounting position of the workpiece on a work table. The operator inputs the machining information with a key board-type data input device in response to the information displayed on the CRT screen, and the machining information is stored in a data storage device. Based upon the stored machining information, the microprocessor then displays on the CRT screen the blank shape and the finished shape of the workpiece so that the operator can observe if the machining information has been correctly input. Unless modification of the stored machining information is required, the microprocessor prepares the numerical control (NC) program based upon the stored machining information. The microprocessor, in response to a machining start command, executes the numerical control function and controls the operation of the machining center in accordance with the NC program.

10 Claims, 26 Drawing Figures

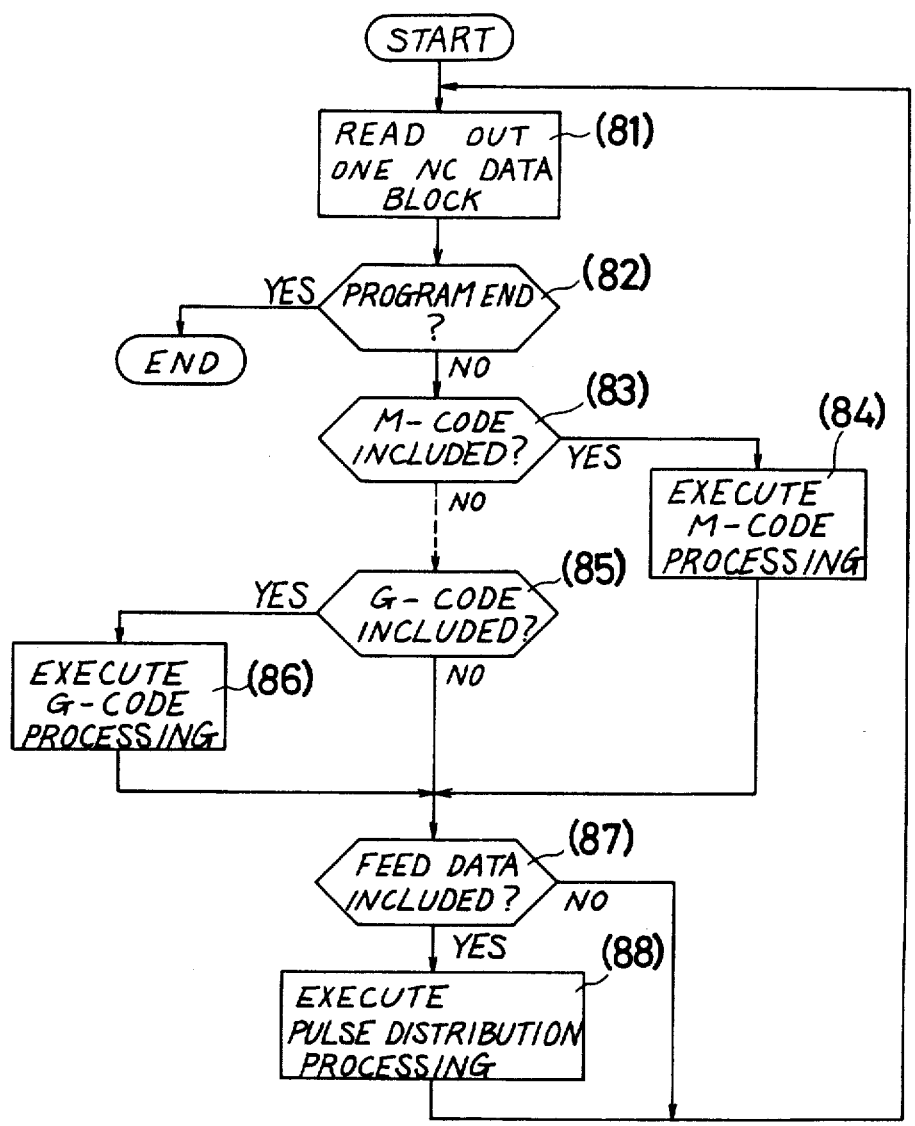

METHOD OF INPUTTING MACHINING INFORMATION TO A MACHINE TOOL NUMERICAL CONTROLLER AND APPARATUS THEREFOR

BACKGROUND OF THE INVENTION

1. Field of the Invention

The present invention relates to a method of and apparatus for inputting machining information to a machine tool numerical controller of the type which enables an operator to input machining information necessary for the machining of workpieces in a conversational mode and which controls the machining of the workpieces in accordance with the machining information so input.

2. Description of the Prior Art

Known numerical controllers for lathes or turning machines have an automatic programming function which enables an operator to input data indicative of machining shapes and the like necessary for the machining of a workpiece, in a conversational mode so as to automatically prepare a numerical control program for the workpiece. Machining operations in the numerically controlled lathes or turning machines involve displacing a tool along two orthogonal axes in a plane including the rotational axis of a work spindle and are therefore relatively simple to control. On the other hand, machining operations in machine tools which are called "machining centers" require the relative movement between a tool and a workpiece along each of three axes each perpendicular to one another. Accordingly, it is difficult or practically impossible to apply such an automatic programming function for lathes or turning machines to numerical controllers for machining centers.

Particularly, when an operator inputs machining position data to a numerical controller in a conversational mode, it must be possible for the operator to easily ascertain whether the input machining position data are correct or not. That is, it must be possible for the operator to confirm the input machining positions on the workpiece by reference to a screen image on a display device and if the input machining positions are not correct, to revise the screen image by inputting new machining position data. However, the known numerical controllers neither have the function to display on a display screen different views of a workpiece whose shape is defined in three dimensions, nor have the function to display on the display screen any views wherein the machining position is defined in three dimensions. Accordingly, in the known numerical controllers, it is impossible for an operator to ascertain whether a machining shape defined by figures of a solid or a body is correct or not.

Further, the prior art numerical controllers are designed to display the shape of any blank workpiece by a profile taken along the rotational axis of the blank workpiece, but not designed to accurately display the shape of any blank workpiece which has a partial protrusion or cavernous bore. Accordingly, when the shape of a blank workpiece having a partial protrusion or cavernous bore is input to the known numerical controller, the input shape of such a blank workpiece is displayed quite different from the actual shape thereof, thereby resulting in that machining positions and shapes on the blank workpiece are very difficult for the operator to confirm.

SUMMARY OF THE INVENTION

Accordingly, it is a primary object of the present invention to provide an improved method of and apparatus for inputting machining information to a machine tool numerical controller which method and apparatus enables an operator to visibly and easily ascertain whether machining information input for machining a workpiece is correct or not.

Another object of the present invention is to provide an improved method of and apparatus for inputting machining information to a machine tool numerical controller which method and apparatus is capable of displaying the shape of any workpiece in such a manner that an operator who inputs machining information on the workpiece can recognize the workpiece shape in three dimensions.

Still another object of the present invention is to provide an improved method of and apparatus for inputting machining information to a machine tool numerical controller which method and apparatus is particularly suitable for use in numerical controllers for machining centers.

A further object of the present invention is to provide an improved method of and apparatus for inputting machining information to a machine tool numerical controller which method and apparatus is capable of displaying on a display screen the shape of a blank workpiece along with a finished shape thereof interposed on the blank shape in the same scale ratio for confirmation by an operator when he inputs machining information on the workpiece.

Briefly, according to the present invention there is provided a method of inputting machining information to a machine tool numerical controller in a conversational mode. The method comprises a first input step of inputting blank shape information defining the shape and dimensions of a blank workpiece to be machined and a second input step of inputting machining definition information defining machining positions on the workpiece and the dimensions of finished shapes to be made at the machining positions. The method further comprises a display step of visibly displaying the shape of the blank workpiece input in the first step and the finished shapes input in the second step in such a manner that the finished shapes are superposed on the shape of the blank workpiece in the same scale ratio and that the operator is able to recognize the shape of the blank workpiece and the finished shapes in three dimensions. In the method, the shape of the blank workpiece and the finished shapes, when displayed on a display screen, are superposed on each other in the same scale ratio and are three-dimensionally recognized by the operator. This advantageously enables the operator to ascertain whether the blank shape information and the machining definition information have been correctly input or not, by comparing the image on the display screen with a part drawing of the workpiece even if the same has a shape defined in three dimensions. Consequently, the machining of the workpiece in accordance with wrong machining information is prevented.

In another aspect of the present invention, there is provided an apparatus for inputting machining information to a machine tool numerical controller in a conversational mode. The apparatus comprises a data input device manually operable for inputting necessary data, a display device having a display screen for visibly displaying various data and shape images, a data storage device for storing a system control program and other data, and a data processor connected to the data input device, the display device and the data storage device. The data processor responds to the system control program and the other data stored in the data storage device and operates to display on the display screen first information for directing an operator to input blank shape information defining the shape and dimension of a blank workpiece to be machined. The data processor stores in the data storage device the blank shape information when the operator inputs the same by manually operating the data input device in response to the first information displayed on the display screen. The data processor further operates to display on the display screen second information for directing the operator to input machining definition information defining machining positions on the workpiece and the dimensions of finished shapes to be made at the machining positions. When the operator inputs the machining definition information, the data processor stores the same in the data storage device. The data processor then responds to the blank shape information and the machining definition information stored in the data storage device and displays on the display screen the shape of the blank workpiece and a number of the finished shapes in such a manner that the finished shapes are superposed on the shape of the blank workpiece in the same scale ratio and that the operator is able to recognize the shape of the blank workpiece and the finished shapes in three dimensions.

BRIEF DESCRIPTION OF THE DRAWINGS

The foregoing and other objects and many of the attendant advantages of the present invention will be readily appreciated as the same becomes better understood by reference to the following detailed description of preferred embodiments when considered in connection with the accompanying drawings, wherein like reference numerals designate identical or corresponding parts throughout the several views, and in which:

FIG. 7 is a specific flow chart of a numerical control execution routine which the microprocessor MPU executes to numerically control the machine tool in accordance with the prepared NC program;

FIG. 12 is an explanatory view showing an NC program prepared and used for machining the workpiece shown in FIGS. 11(a) and 11(b);

DETAILED DESCRIPTION OF PREFERRED EMBODIMENTS

Figure 1:
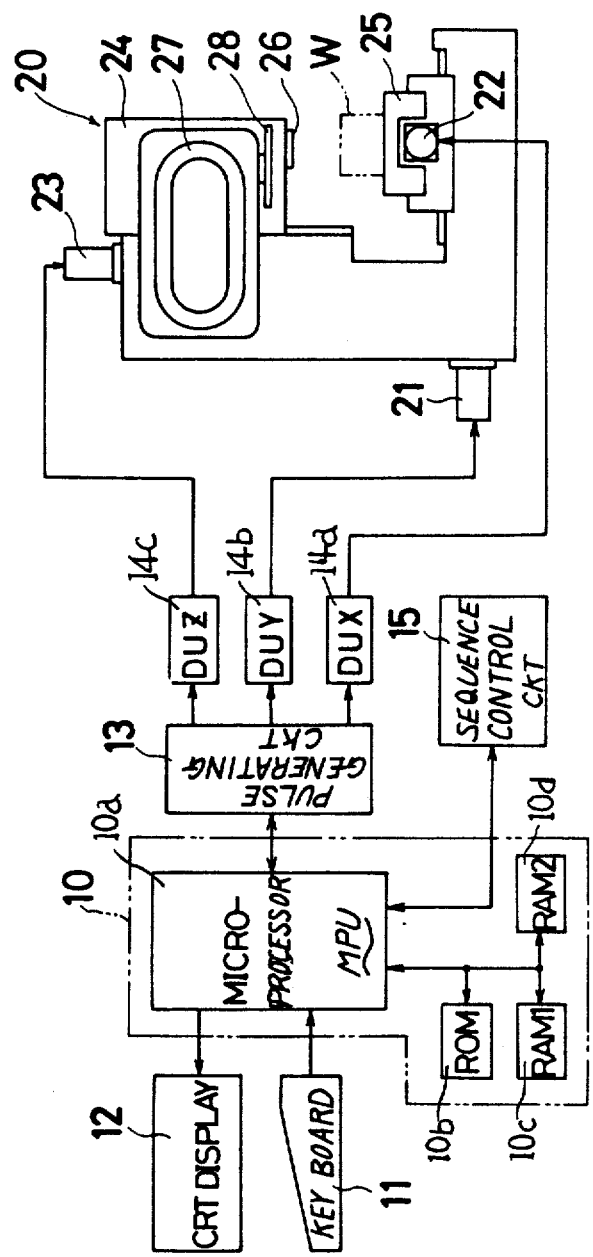
FIG. 1 is a general block diagram of a numerical controller which uses a method and apparatus according to the present invention, also showing a schematic elevational view of a machine tool controllable by the numerical controller.

Referring now to FIG. 1, there is illustrated a central processing unit 10, which constitutes a main component of a numerical controller. The processing unit 10 is comprised of a microprocessor MPU 10a, a read-only memory ROM 10b, a battery-supported random access memory RAM 10c free from volatility, and a random access memory RAM 10d which is utilized as a data buffer. The microprocessor MPU 10a is connected through interface circuits, not shown, to a keyboard 11 used as a data input means, to a CRT display unit 12 serving as a data display means, to a pulse generating circuit 13 for distributing command pulses to servomotor drive circuits DUX 14a, DUY 14b, and DUZ 14c, and to a sequence control circuit 15.

A machining center 20 controllable by the numerical controller is provided with servomotors 21, 22 and 23 respectively connected to the drive circuits DUY 14b, DUX 14a and DUZ 14c. The relative position between a work table for supporting a workpiece W and a spindle head 24 rotatably carrying a tool spindle 26 is altered in three directions perpendicular to one another when the servomotors 21, 22 and 23 are rotated. The machining center 20 is also provided with a tool magazine 27 for removably storing a plurality of diverse tools and an automatic tool exchanger 28. The tool exchanger 28 exchanges a tool in the tool spindle 26 with one of the tools selectively presented by a magazine indexing device, not shown, to a tool change position n the tool magazine 27, whereby the workpiece W can be machined with the diverse tools selectively received in the tool spindle 26.

Figure 2:
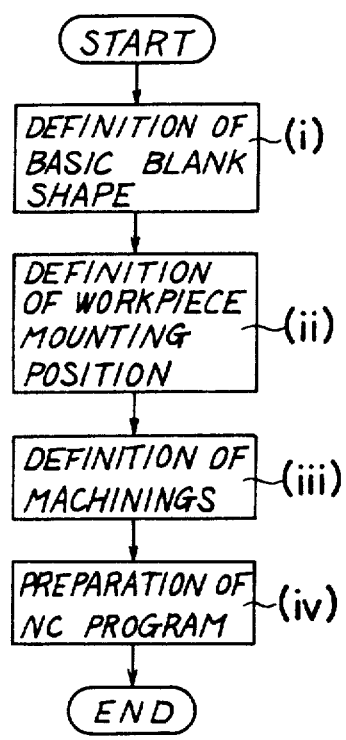
FIG. 2 is a general flow chart of a system control program executed by a microprocessor MPU shown in FIG. 1.

The central processing unit 10 is operated in accordance with a system control program stored in the read-only memory ROM 10b to selectively perform an automatic programming function and a numerical control function. The processing unit 10, in the automatic programming function, prepares a numerical control program (hereafter referred to as an NC program) based upon required machining information or data which is input by the keyboard 11 in a conversational mode, and in the numerical control function, controls the machine tool 20 (i.e., the servomotors 21, 22 and 23, the magazine indexing device, the tool exchanger 28, a tool spindle drive motor, and the like, not shown) in accordance with the prepared NC program. In this particular embodiment, the automatic programming function and the numerical control function are performed by the single microprocessor MPU 10a as follows:

The microprocessor MPU 10a first executes an automatic programming routine generally shown in FIG. 2 to prepare an NC Program for use in machining a workpiece W and to store it in an NC data area of the random access memory RAM 10c. Thereafter, the microprocessor MPU 10a executes a numerical control routine shown in FIG. 7 to control the operation of the machining tool 20 in accordance with the NC program stored in the NC data area in the memory RAM 10c.

The microprocessor MPU 10a, when executing the numerical control routine, reads out the NC data constituting the NC Program from the random access memory RAM 10c, block by block, and in accordance with each read-out NC data block, enables the pulse generating circuit 13 to distribute feed pulses to any of the servomotor drive circuits DUX 14a, DUY 14b and DUZ 14c and simultaneously, enables the sequence control circuit 15 to perform an auxiliary control operation such as, for example, a magazine indexing operation, a tool exchange operation, a spindle stop or the like. Such numerical control operation of the microprocessor MPU 10a is the same as that of a conventional computerized numerical controller known as "CNC". Accordingly, the details of the numerical control operation the microprocessor MPU 10a performs is omitted herein, and the automatic programming function of the microprocessor MPU 10a will be described hereafter in detail.

As shown in FIG. 2, processings that the microprocessor MPU 10a executes in the automatic programming function are roughly classified into four steps i–iv of defining the shape of an unfinished workpiece, of defining the mounting position of the workpiece relative to a machine origin, of defining machinings and of preparing an NC program. The four steps are executed in order as follows:

Definition of Workpiece Shape

Figure 3:
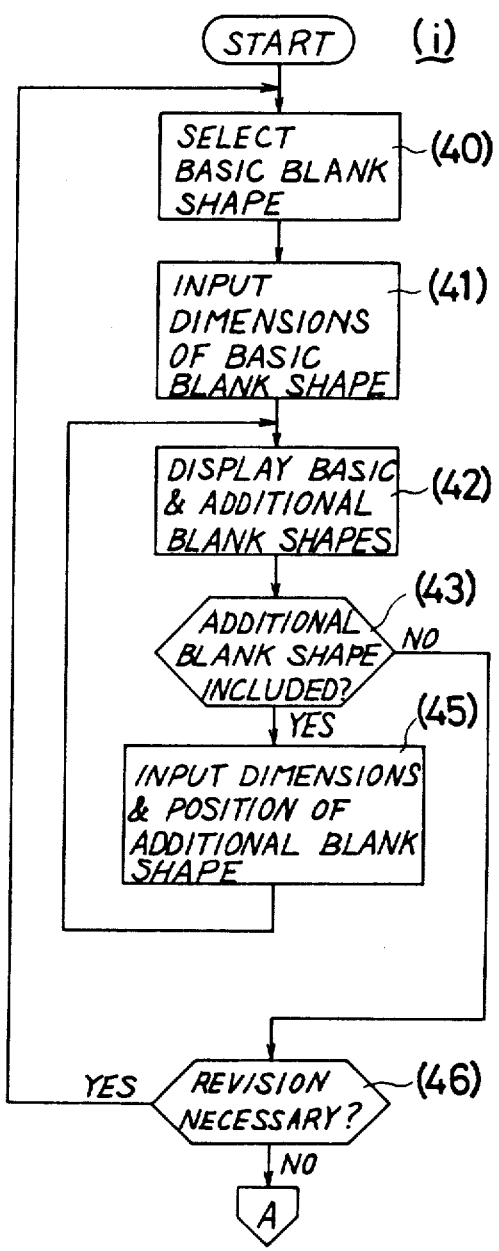
FIG. 3 is a specific flow chart of a blank shape definition routine which the microprocessor MPU executes in step (i) of FIG. 2.

This step is to define the shape of a blank or workpiece to be machined on the machine tool 20. FIG. 3 shows processing executed in this step.

Generally, workpieces machined by a machine tool called a "Machining Center" have a number of protrusions and cavernous bores. However, the shapes of such workpieces are usually a combination of a number of rectangular parallelepipeds and circular cylinders and are formed with a number of round holes and square holes. For this reason, in this particular embodiment, one rectangular parallelepiped or one circular cylinder is used to define any basic blank shape, and one rectangular parallelepiped, one circular cylinder, one round hole or one square hole is used to define any additional blank shape. Accordingly, the entire shape of any workpiece W can be defined by a combination of one basic blank shape and one or more additional blank shapes.

Figure 8A:
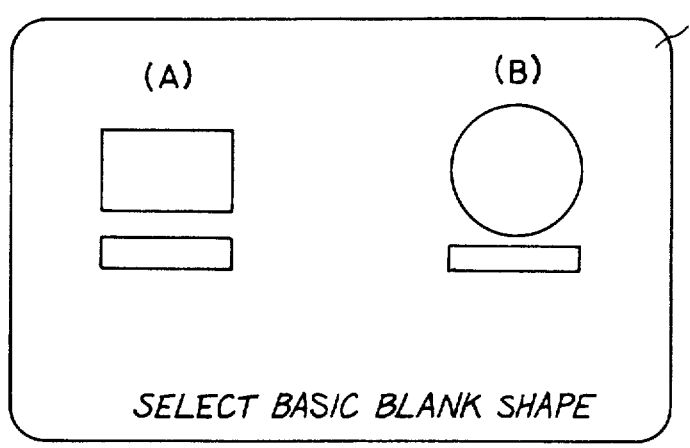
FIGS. 8(a)-8(e) are explanatory views showing images which are selectively generated on a screen of a CRT display device shown in FIG. 1 when the blank shape definition routine is executed.
Figure 8B:
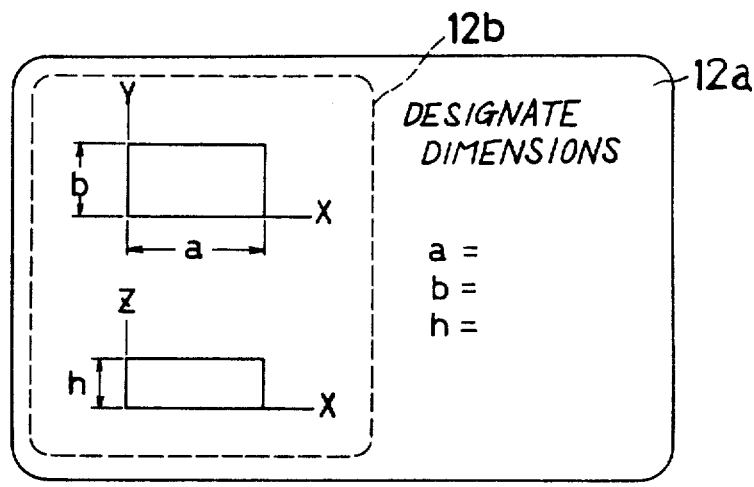

In order to define the shape of a workpiece, the microprocessor MPU 10a first executes step 40 of FIG. 3, wherein one rectangular parallelepiped and one circular cylinder as the menu of the basic blank shape are simultaneously displayed by their plan views and front or elevational views on a screen 12a of the CRT display unit 12, as shown in FIG. 8(a). Such display directs an operator to make by the keyboard 11 a response stating that the general shape of the workpiece W is a rectangular parallelepiped or a circular cylinder. For this purpose, the CRT screen 12a also displays selection marks "(A)" and "(B)" respectively over the plan views of the rectangular parallelepiped and the circular cylinder, along with a message "SELECT BASIC BLANK SHAPE". In response to this, the operator depresses an A-imprinted character key of the keyboard 11 when the general shape of the workpiece W is a rectangular parallelepiped or a B-imprinted character key of the keyboard 11 when it is a circular cylinder.

Assuming now that the operator depresses the A-imprinted character key for selection of the rectangular parallelepiped, the microprocessor MPU 10a executes step 41 to erase the screen images shown in FIG. 8(a) and to display the plan and elevational views of a rectangular parallelepiped with a predetermined shape respectively at upper and lower portions of a scaling zone 12b which occupies the left half of the screen 12a. A message is also displayed at the right portion of the screen 12a for requesting the inputting of data which indicate dimensions (a, b and h) of the workpiece W in the X, Y and Z-axis directions.

Figure 8C:
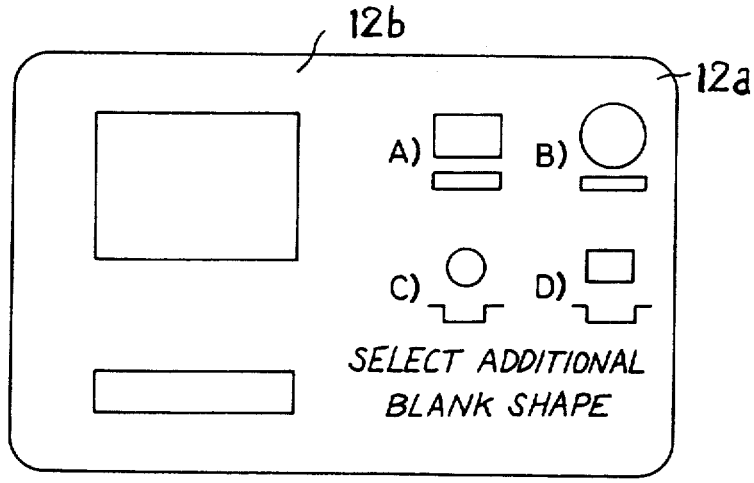
Figure 8D:
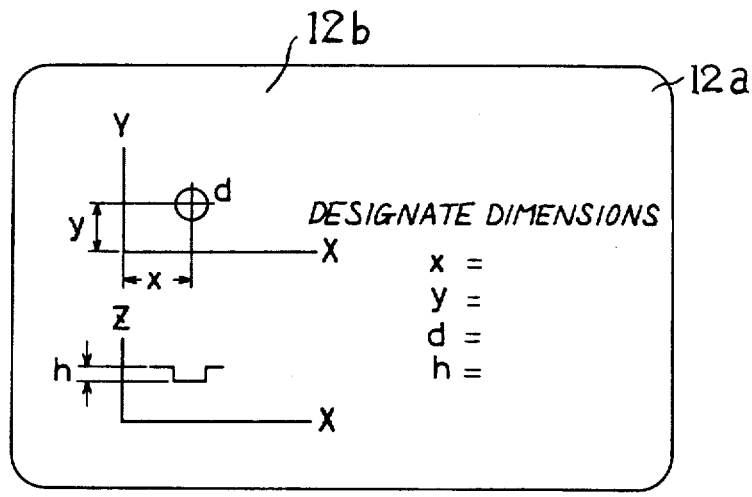

When the operator inputs the dimension data (a, b and h) in response to the message, the microprocessor MPU 10a reads and stores the data in the random access memory RAM 10d for temporary storage. Step 42 then follows, wherein the plan and elevational views of a rectangular parallelepiped having the dimensions so input in longitudinal, transverse and height directions are displayed on the scaling zone 12b of the CRT screen 12a, as shown in FIG. 8(c). At the same time, respective plan and elevational views of four additional blank shapes including one general rectangular parallelepiped, one general circular cylinder, one general round hole and one general square hole are also displayed at the right half of the CRT screen 12, along with a message given at the right-lower portion of the CRT screen 12 which instructs the operator to select one of the four additional blank shapes. If the workpiece W is a simple rectangular parallelepiped having no additional blank shape, the operator depresses an N-imprinted character key of the keyboard 11, which advances the routine of the microprocessor MPU 10a from step 43 to step 46 without executing the processing for any additional blank shape. If the workpiece W has a vertical round through hole as exemplified in FIGS. 11(a) and 11(b), however, the operator depresses a C-imprinted character key of the key board 11 in correspondence to a selection mark "(C)" which is put on the left of the plan and elevational views of the general round hole displayed on the CRT screen 12a. This manipulation by the operator causes the microprocessor MPU 10a to next execute step 45, whereby an image shown in FIG. 8(d) is displayed on the CRT screen 12a. The image includes illustrations in which lengths in X and Y-axis directions between the center of the round hole and a reference point of the basic blank shape and the diameter and the depth of the round hole are respectively represented by x, y, d and h. The image further includes a message directing that the operator designate these dimensions (x, y, d and h). It is to be noted herein that in the case of the basic blank shape being a rectangular parallelepiped, the reference point thereof in an X-Y plane uses the left-lower corner of the basic blank shape as viewed in the plan view, and that in the case of the basic blank shape being a circular cylinder, the reference point thereof in the X-Y plane uses the axis of the circular cylinder.

In response to the message, the operator successively inputs the designated dimensions (x, y, d and h) by a set of numeric keys of the key board 11. Upon completion of this data input, the routine is returned from step 45 to step 42, in which the microprocessor MPU 10a generates a blank shape incorporating the round hole as an additional blank shape into the rectangular parallelepiped as a basic blank shape, based upon the input data indicative of the dimensions and position of the round hole and displays plan and elevational views of the generated blank shape at the scaling zone 12b. The display of the blank shape at the scaling zone 12b is done with a change in scale based upon data indicating the dimensions of the input basic blank shape as well as data indicating the dimensions and position of the input additional blank shape. This enables the operator to easily make sure whether the dimension data indicating the size and position of the additional blank shape have been properly input or not, by comparing the displayed image with a part drawing concerned.

Figure 8E:
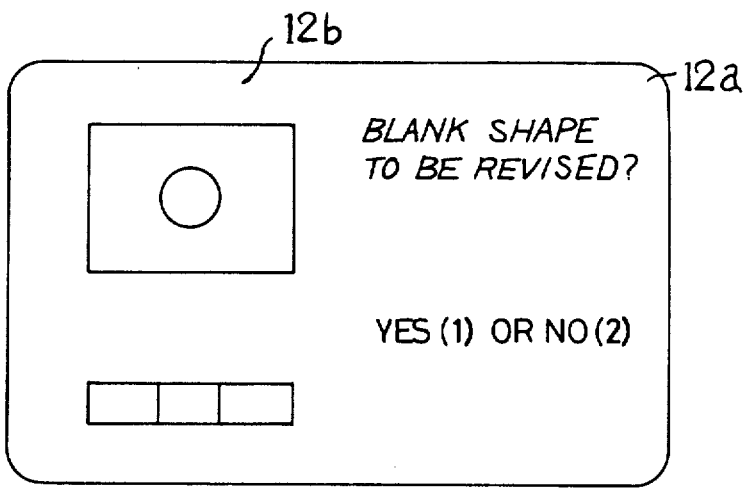

The addition of another additional blank shape can be done in succession by repeating manipulations similar to those described above. Exemplifying the workpiece shown in FIGS. 11(a) and 11(b), reference characters P1, P2, P3 and P4 denote holes to be machined, of which no additional blank shape is defined. Accordingly, when step 42 is executed after the additional blank shape of the round through hole P5 is defined, an N-imprinted key of the key board 11 is depressed because there are no further additional blank shapes provided. This causes the microprocessor MPU 10a to advance its processing from step 43 to step 46, wherein the microprocessor MPU 10a makes inquiries as to whether modification is necessary of the blank shape defined by the foregoing manipulations or not, by displaying an image shown in FIG. 8(e) on the CRT screen 12a. If such modification is necessary, a 1-imprinted numeric key of the key board 11 is depressed by the operator so as to return the routine from step 46 to step 40, whereby the microprocessor MPU 10a is enabled again to execute the foregoing processings. However, if such modification is unnecessary, a 2-imprinted numeric key of the key board 11 is depressed instead, and this moves the routine from step 46 to step 50 of FIG. 4 with the result of completing the foregoing processings for definition of a blank shape.

Definition of Workpiece Mounting Position

Figure 4:
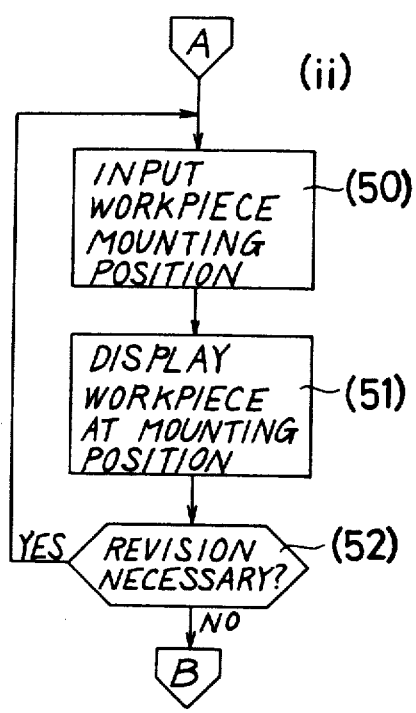
FIG. 4 is a specific flow chart of a mounting position definition routine which the microprocessor MPU executes in step (ii) of FIG. 2.
Figure 9A:
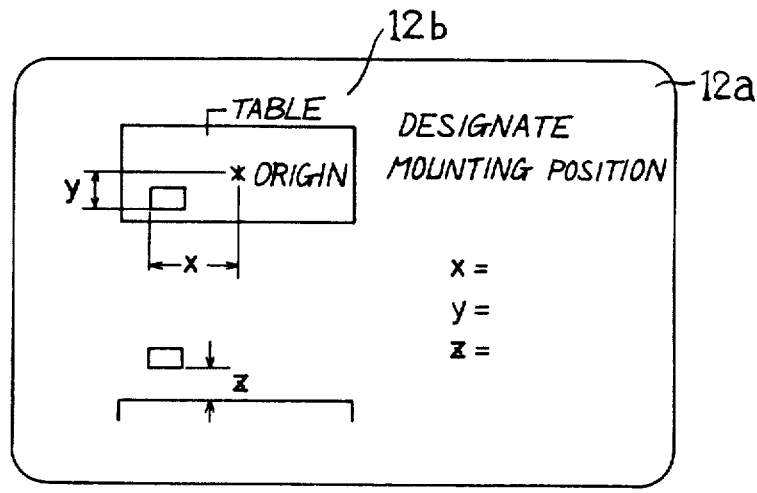
FIGS. 9(a) and (b) are explanatory views showing images which are selectively generated on the CRT screen when the mounting position definition routine is executed.

When step 50 of FIG. 4 is reached, the microprocessor MPU 10a displays the general shape of the machine tool work table 25 and the basic blank shape at the scaling zone 12b of the CRT screen 12a, as shown in FIG. 9(a). Symbols x and y respectively indicating distances in the X and Y-directions between the machine origin and the reference point of the workpiece W and another symbol Z indicating the distance between the upper surface of the work table 25 and the lower surface of the workpiece W are simultaneously displayed along with a message requesting the operator to designate dimensions respectively corresponding to symbols x, y and z.

Figure 9B:
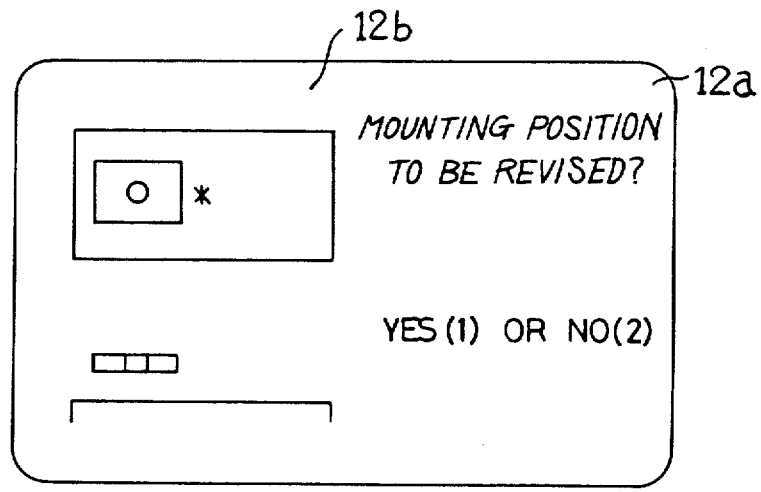

In response to the message, the operator inputs dimension data respectively corresponding to the symbols x, y and z, and the microprocessor MPU 10a then executes step 51 to simultaneously display the blank shape of the workpiece W defined by the foregoing processings and the machine tool work table 25 at the scaling zone 12b of the CRT screen 12a. In this processing, actual dimensions of the work table 25 being stored in a machine tool parameter area of the randon access memory RAM 10c is read out to be scaled down or reduced in a predetermined ratio, and the image of the work table 25 with the dimensions so reduced is displayed at the scaling zone 12b. The dimensions of the blank shape input by the foregoing manipulations and the distances in the X, Y and Z-direction between the machine tool origin and the workpiece reference point are also reduced in the same ratio as the reduction of the actual table dimensions. The image of the blank shape with dimensions so reduced is displayed at the scaling zone 12b, with itself being spaced apart from the machine origin by the reduced distances in the X, Y and Z-directions, as shown in FIG. 9(b).

Accordingly, the observation of the plan and elevational views on the CRT screen 12a enables the operator to make sure that the size and the mounting position of the workpiece W have been properly input by the contrast between the displayed image of the workpiece W and the displayed image of work table 25. The plan and elevational views on the CRT screen 12a, when compared with the actual mounting position of the workpiece W on the machine tool 20, also enables the operator to confirm that the definition of the workpiece mounting position is correct. This is because if the distances indicating the workpiece mounting position have been input with a large dimensional error, then the relative position between the displayed workpiece and work table images on the CRT screen 12a can be seen differently from that between the workpiece W and the machine tool work table 25.

When the image illustrating the mounting position of the workpiece W is displayed in this manner, there is simultaneously displayed on the right half of the CRT screen 12a a message questioning the operator of whether modification is necessary with regard to the mounting position data having been input by the manipulations in step 50.

Figure 5:
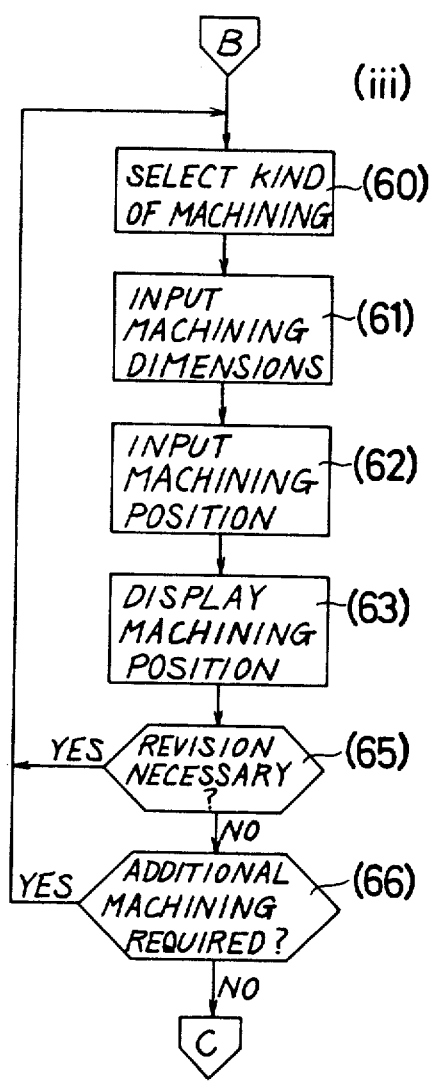
FIG. 5 is a specific flow chart of a machining definition routine which the microprocessor MPU executes in step (iii) of FIG. 2.

If such modification is necessary, the 1-imprinted key of the key board 11 is depressed to return the processing of the microprocessor MPU 10a from step 52 to step 50, whereby the routine shown in FIG. 4 is executed again. On the contrary, if no such modification is necessary, the 2-imprinted numeric key is depressed and the microprocessor MPU 10a completes the processings for definition of the workpiece mounting position to advance its operation to step 60 of FIG. 5.

Definition of Machinings

Figure 10A:
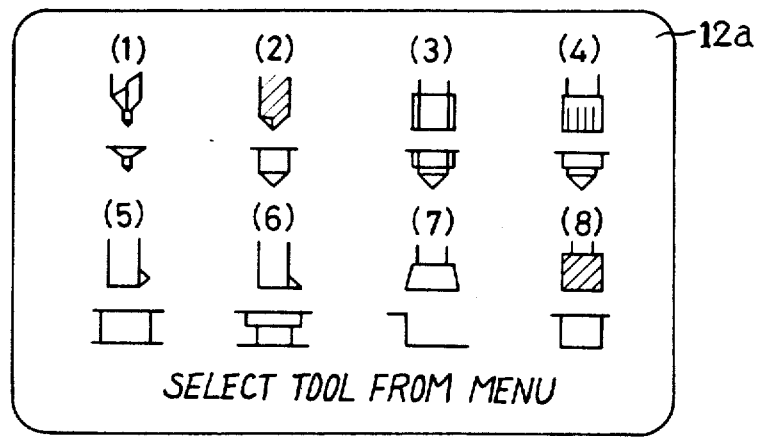
FIGS. 10(a)-10(f) are explanatory views showing images which are selectively generated on the CRT screen when the machining definition routine is executed.

After completion of the processings for definition of the workpiece mounting position in the above-described manner, the microprocessor MPU 10a displays on the CRT screen 12a a menu of tools used in the machine tool 20. This display can be done by displaying on the CRT screen general images of a centering tool, a drilling tool, a tapping tool, a boring tool and the like along with a message "SELECT TOOL FROM MENU", as shown in FIG. 10(a).

Figure 10B:
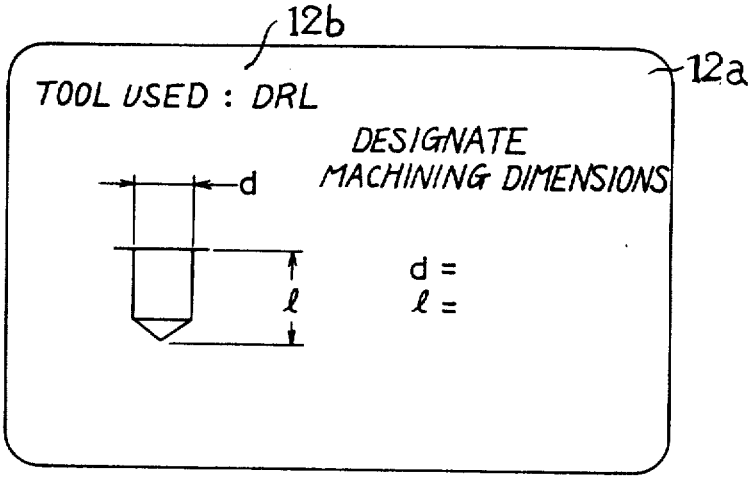
Figure 10C:
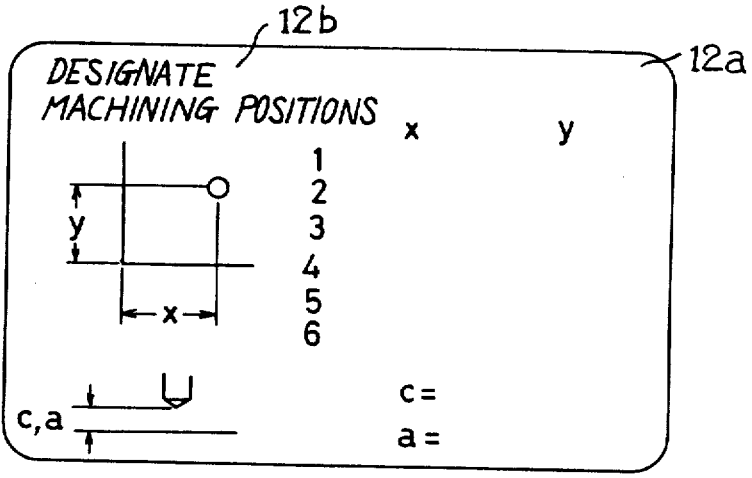
Figure 11A:
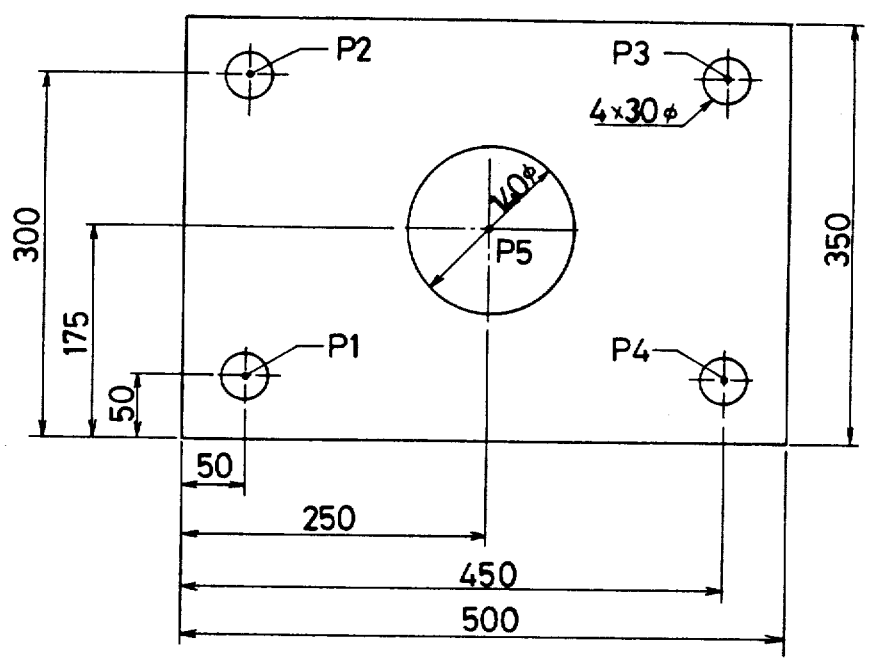
FIGS. 11(a) and 11(b) are explanatory views showing one example of the finished shape of a workpiece.
Figure 11B:
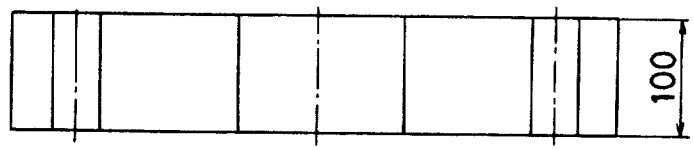

Assuming now that in the machining of the workpiece W shown in FIGS. 11(a) and 11(b), a first machining step is to be carried out to make a through hole at each of the four corner portions of the workpiece W, the operator inputs a numeral "2" by depressing the 2-imprinted numeric key corresponding to data "(2)" over the drilling tool on the CRT screen 12a. The microprocessor MPU 10a thus recognizes that a driling tool is used in the first machining step. Step 61 is next executed, wherein the microprocessor MPU 10a displays on the CRT screen 12a the general image of a drilling hole along with a message directing the operator to input data indicative of the diameter (d) and depth (l) of the drilling hole, as shown in FIG. 10(b).

When the diameter (d) and the depth (l) of the drilling hole are input in response to the message, the microprocessor MPU 10a then displays on the CRT screen 12a a general image illustrating the relative positions (x, y) in the X and Y-axis directions between the center of the drilling hole and the reference point of the workpiece W, along with another general image illustrating an air-cut feed amount (a) and a retraction feed amount (c) from the upper surface of the workpiece W. The CRT screen image at this time also includes a message directing the operator to input the necessary data (x, y, a and c).

Figure 10D:
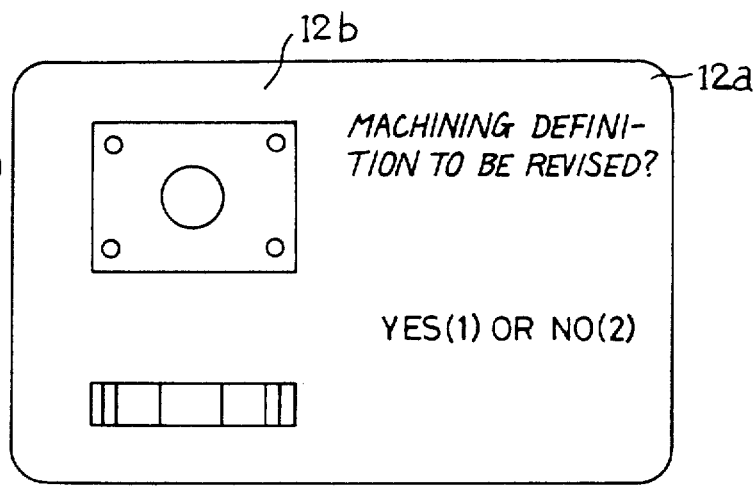

In response to the message, the operator successively inputs the positions of holes at the four corner portions of the workpiece W by reference to the part drawing and further inputs the retraction feed amount (c) and the air-cut feed amount (a). Step 63 is next executed, wherein the microprocessor MPU 10a displays at the scaling zone 12b of the CRT screen 12a the figures of holes respectively superposed on portions of the figure of the workpiece blank shape which are designated by the input hole position data, as shown in FIG. 10(d). In this display, the input diameter of each hole and the input distances in the X and Y-directions between the center of each hole and the reference point of the blank shape displayed are reduced in the same ratio as the reduction of the blank shape, and each hole with the diameter so reduced is displayed at such a position as to be spaced from the reference point of the blank shape by the reduced distances respectively in the X and Y-directions. If the position data on each hole has been exactly input as designated on the part drawing, the position of each displayed hole relative to the displayed blank shape is observed to be in coincidence with the position of each corresponding hole relative to the workpiece on the part drawing. Accordingly, the operator can easily ascertain that the position data of each hole has been input correctly, by comparing the image on the CRT screen 12a with the part drawing.

Figure 10E:
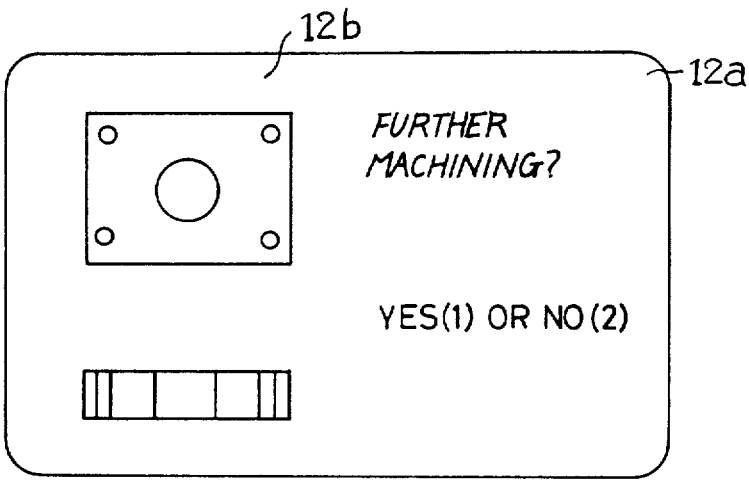

When the blank shape with the holes is displayed in the above-described manner, a message questioning the operator about the necessity of modification is simultaneously displayed at the right half of the CRT screen 12a. With such modification being necessary, the operator inputs the 1-imprinted numeric key, which causes the return of the routine from step 65 to step 60, whereby the microprocessor MPU 10a successively executes the steps 60-63 again. With such modification being unnecessary, the operator inputs the 2-imprinted numeric key to display at the right half of the CRT screen 12a a message which as shown in FIG. 10(e), questions the operator as to whether a further machining is required on the workpiece W.

Figure 10F:
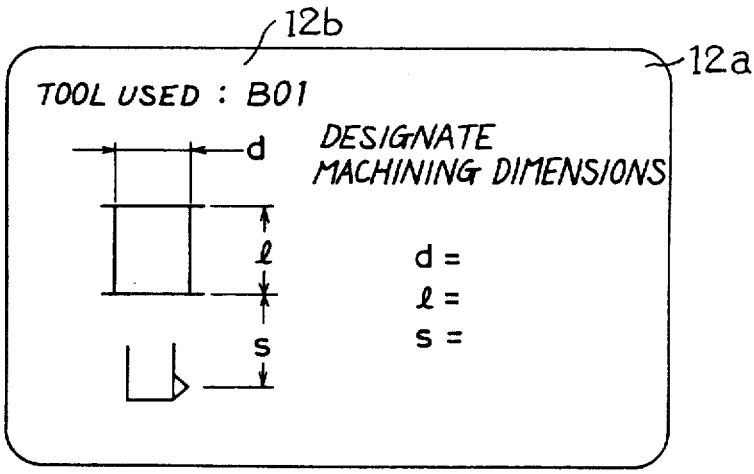

Assuming now that the workpiece W shown in FIGS. 11(a) and 11(b) needs a boring of the bore formed at its center portion in a second machining step, the operator depresses the 1-imprinted numeric key. The microprocessor MPU 10a responds to this input by returning its operation from step 66 to step 60 to execute the series of steps 60-65 again. Since the second machining step is for a boring, the operator in this case depresses a 5-imprinted numeric key or a 6-imprinted numeric key when the tool menu shown in FIG. 10(a) is displayed on the CRT screen 12a in step 60. Thus, a screen image shown in FIG. 10(f) is displayed in step 61 along with a message directing the operator to input necessary data, i.e., a bore diameter (d), a bore depth (l) and an allowable thrusting-through length (s) of a boring tool quill. The operator inputs the required data in response to the message. The subsequent steps 62-66 are executed in the same manner as described hereinbefore. In step 63, the figure of a finished bore newly defined is displayed with itself being superposed on the figure of the unfinished center bore given to the blank shape. When the position of the finished bore has been exactly defined, the finished bore comes into a concentric relation with the unfinished center bore defined as a part of the blank shape. There is no substantial difference between the diameters of the finished bore and the unfinished bore. Therefore, the figures of the finished and unfinished bores are overlapped with each other when displayed. All of the machining data input in the above-described manner are stored in the random access memory RAM 10c for later use.

Preparation of NC Program

Figure 6:
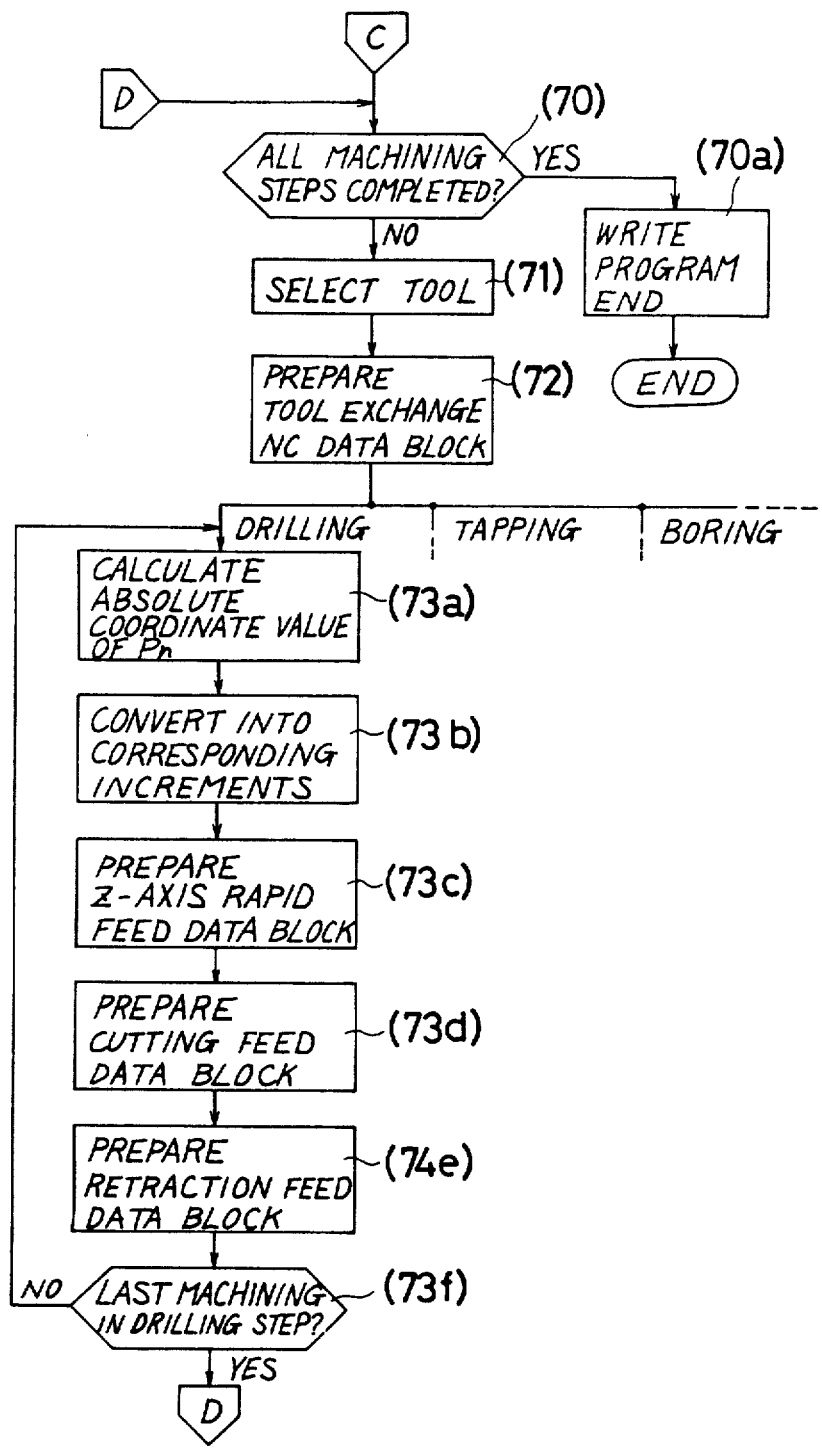
FIG. 6 is a specific flow chart of an NC program preparation routine which the microprocessor MPU executes in step (iv) of FIG. 2.
Figure 12:
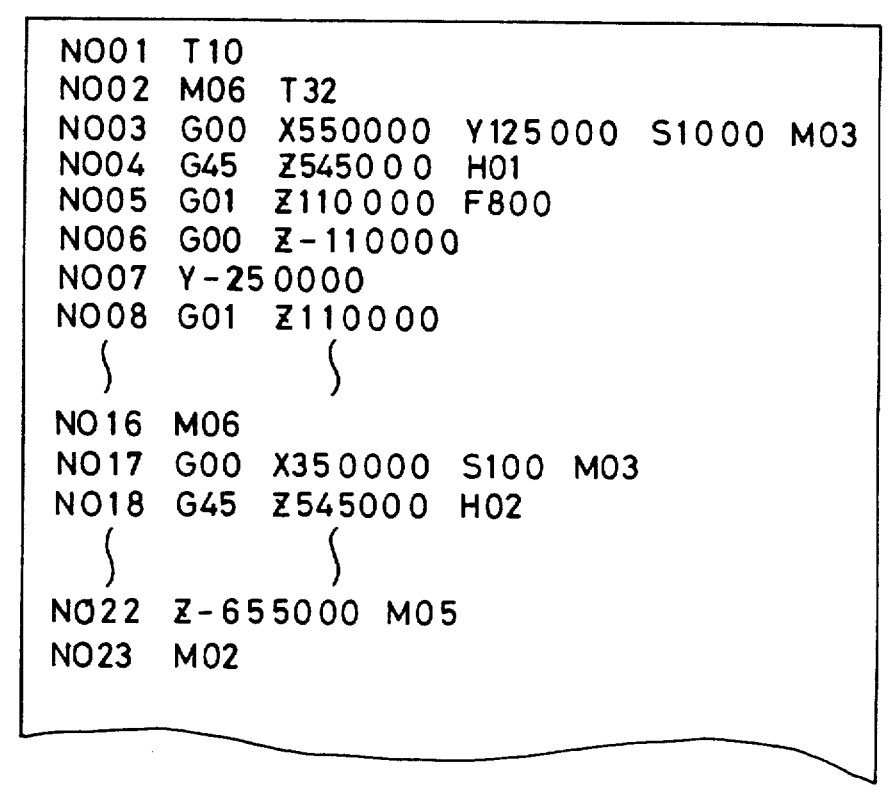

When the definition of machinings is completed in the foregoing manner, the microprocessor MPU 10a then executes step 70 of FIG. 6 to initiate the preparation of an NC program. First of all, it is ascertained in step 70 whether the preparation of an NC program has been completed up to a final machining step of the program. If it has been completed, step 70 is followed by step 71, wherein a tool to be used in a machining step concerned is selected to identify a tool number of the selected tool. In this tool selection, the contents of a tool data file stored in the random access memory RAM 10c are searched for that coinciding with the tool data which have already been input in steps 60 and 61 of FIG. 5 in connection with the appropriate tool to be used in the corresponding machining step. A tool having coinciding tool data is selected from a plurality of tools registered in the tool data file, and a tool number of the selected tool is read out from the tool data file. At the same time, another tool to be used in a successive machining step is also selected, and a tool number of the selected tool is identified. The completion of tool selection in this manner causes the routine to move from step 71 to step 72, wherein the microprocessor MPU 10a prepares an NC data block for instructing that the tool to be used in the first machining step be indexed to a tool exchange position and then be attached to the tool spindle 26. The microprocessor MPU 10a in step 72 further prepares another NC data block for instructing that another tool to be used in a successive machining step be indexed to the tool exchange position. The NC data blocks prepared in this step can be seen at, for example, block numbers "N001" and "N002" of an NC program shown in FIG. 12.

Upon completion of these processings, the operation of the microprocessor MPU 10a is directed to one of the routines corresponding to the kind of machining in order to prepare an NC program portion corresponding to that kind of machining. In the machining example described herein, the first machining step is for drilling and thus, NC data blocks for drilling are prepared.

More specifically, step 73a is first executed to calculate an absolute coordinate value of the first hole P1, one of the four holes P1-P4 which have been defined as machining positions in the foregoing machining definition step. The calculation of the coordinate value can be done by arithmetically processing the data representing the mounting position of the workpiece W and the data representing the position of the first hole P1 relative to the reference point of the workpiece W. These data have already been input and stored in the random access memory RAM 10c in the foregoing mounting position definition step and the foregoing machining definition step. The coordinate value so calculated is converted in step 73 into a corresponding incremental coordinate value, namely into X and Y-axis feed increments. These feed increments are used to compare a part of one NC data block. Since it is necessary to operate the X and Y-axes at a rapid feed rate through the feed increments, a rapid feed rate command "G00" is incorporated into the NC data block, as seen at N003-data block in FIG. 12. Further, spindle rotational speed data "S1000" registered for the first selected drilling tool is read out from the tool data file, and along with a rotational direction command "M03", is added to the same NC data block. Following this, step 73c is next executed to calculate a Z-axis rapid feed amount by arithmetically processing the data representing the position of an upper surface of the workpiece W and the data representing the air-cut feed amount (a). Further, the microprocessor MPU 10a selects and reads out tool position offset data resistered for the tool used, from the tool data table and prepares one NC data block which as seen at block number "N004" in FIG. 12, includes Z-axis feed amount data "Z545000" and tool position offset data "G45" and "H01". The microprocessor MPU 10a in step 73d prepares another NC data block as seen at block number "N005", based upon the data representing the depth of the hole to be machined and other data and in step 73e, prepares still another NC block for tool retraction as seen at block number "N006", whereby the preparation of an NC program portion for drilling the first hole P1 is completed. Step 73f follows and is executed to ascertain whether all of the NC data blocks, which are necessary for effecting machinings at all of the four machining positions P1-P4 included in the same machining step, have been prepared or not. The routine is returned to step 73a to execute the series of steps 73a-73e if they have not yet been prepared, while it is returned to step 70 if they have already been prepared. Accordingly, an NC program portion for successsively effecting drilling operations at the four machining positions P1-P4 are prepared when the series of steps 73a-73e are repeatedly executed four times. Subsequently, the operation of the microprocesor MPU 10a is returned to step 70 to prepare an NC program portion which is necessary for effecting a boring operation in a second machining step. The preparation of the NC program portion for the boring operation is executed in a manner similar to the preparation of the drilling operation, and the detailed description thereof is therefore omitted for the sake of brevity. However, it is to be noted that in step 72, the microprocessor MPU 10a prepares an NC data block for returning the machine tool spindle head 24 to a tool exchange ready position, before preparing an NC data block for effecting a tool exchange operation.

In the above-described manner, the NC program is prepared based upon the machining information input in a conversational mode, whereupon the microprocessor MPU 10a remains in a stand-by state. When the machining start command is given thereafter, the microprocessor MPU 10a executes an NC execution routine shown in FIG. 7. Execution of the NC execution routine results by successively executing the data blocks of the prepared NC program, whereby the operation of the machine tool 20 is controlled to precisely machine the workpiece W to such shape and dimension as defined by the operator. Briefly, in the execution of the NC execution routine, the microprocessor MPU 10a reads out one NC data block from the random access memory RAM 10c in step 81, and when confirming in step 87 that the read-out NC data block includes feed command data, executes a processing for pulse distribution in step 88. The microprocessor MPU 10a in this processing cooperates with the pulse generating circuit 13 to make the pulse generating circuit 13 distribute feed pulses to the servomotor drive circuits DUX 14a, DUY 14b and DUZ 14c. The microprocessor MPU 10a in step 83 and 84 outputs an auxiliary function command to the sequence control circuit 15 in accordance with M-code data included in the read-out NC data block and in steps 85 and 86 processes G-code data included in the read-out NC data block in a well known manner.

Figure 13:
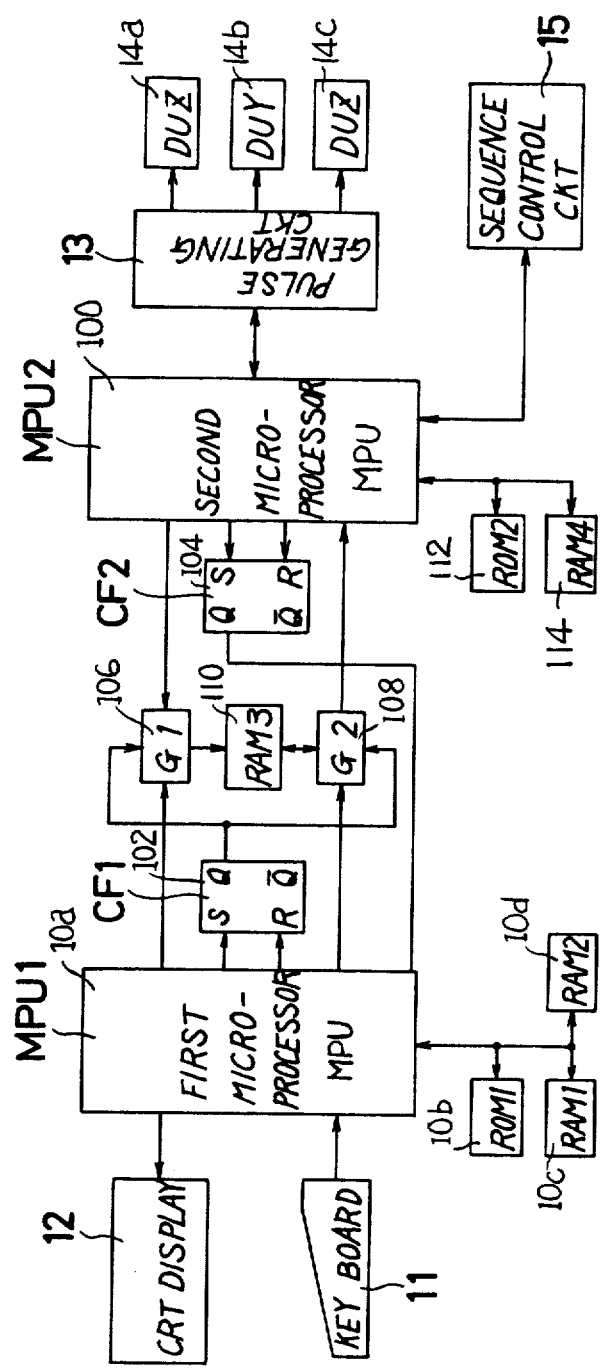
FIG. 13 is a general block diagram of another numerical control system which practices the method according to the present invention and which incorporates the apparatus according to the present invention.
Figure 14:
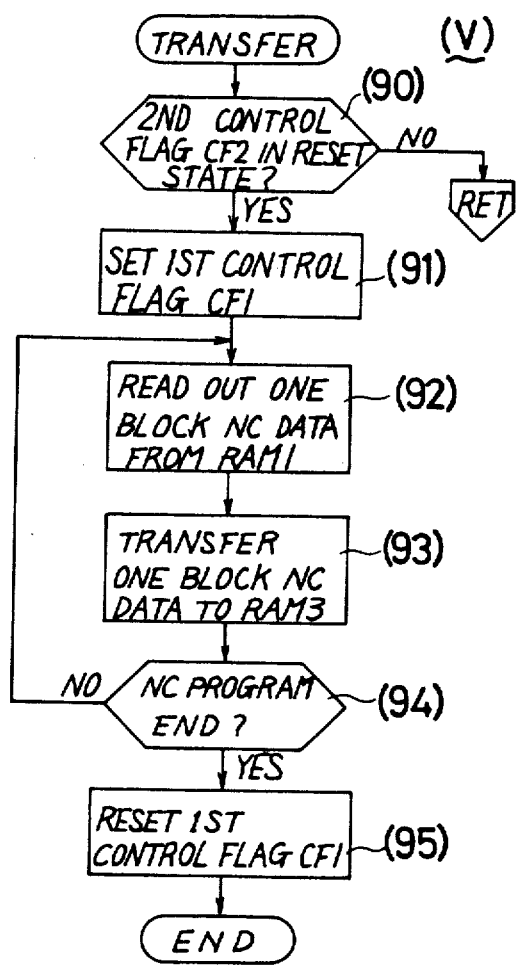
FIG. 14 is a specific flow chart of an NC program transfer routine which a first microprocessor executes to transfer an NC program from a first random access memory to another random access memory accessible by a second microprocessor in the numerical control system shown in FIG. 13.
Figure 15:
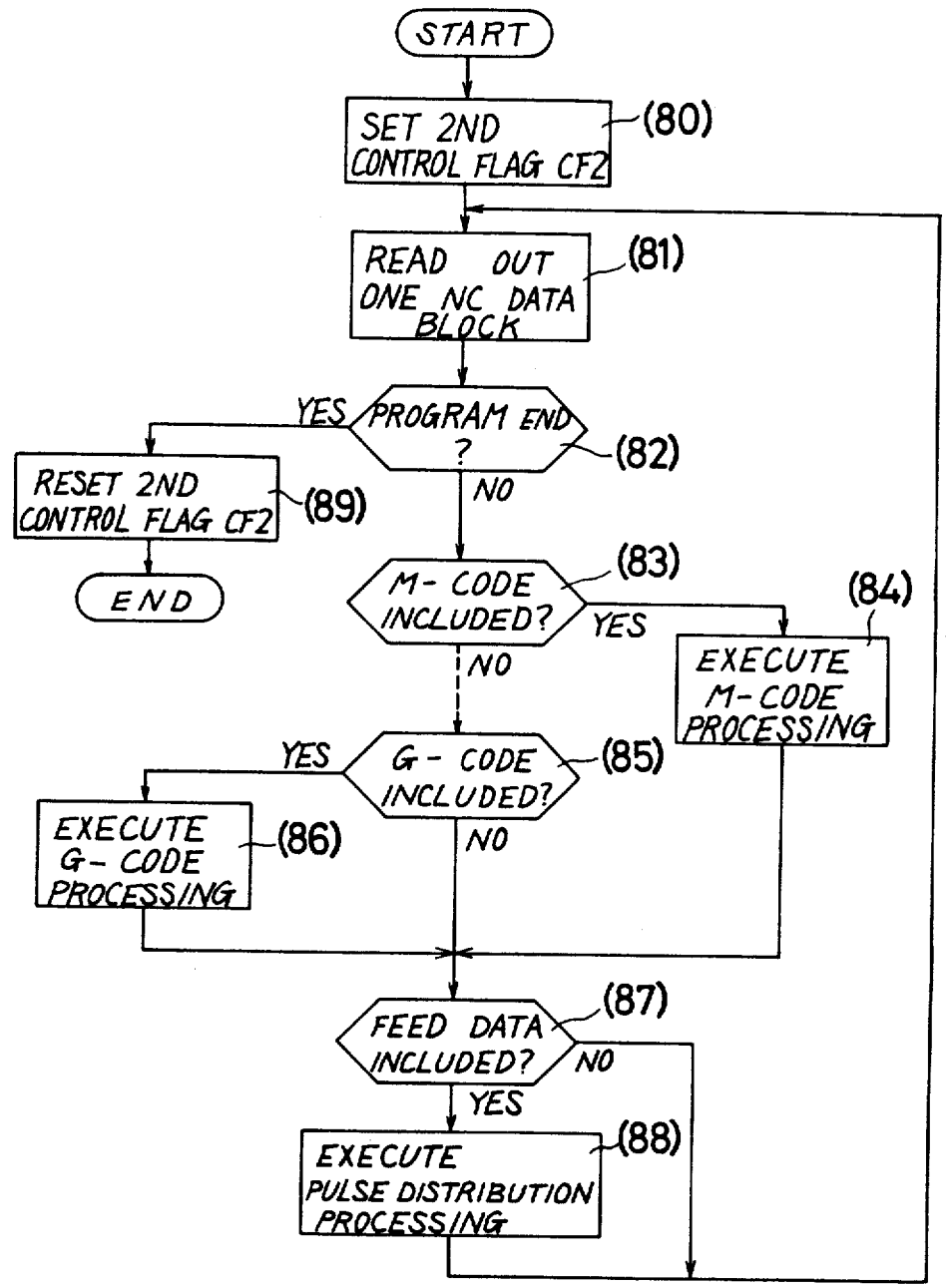
FIG. 15 is a specific flow chart of a numerical control routine which replaces that shown in FIG. 7 and which the second microprocessor in the numerical control system shown in FIG. 13 executes to control the machine tool of FIG. 1 in accordance with the NC program transferred to and stored in the random access memory accessible by the second microprocessor.

Referring now to FIGS. 13-15, there is shown another embodiment of a machine tool numerical control system according to the present invention. The system employs first and second microprocessors MPU 10a and MPU 100. The first microprocessor MPU 10a is dedicated to the aforementioned automatic programming function, while the second microprocessor MPU 100 is dedicated to the aforementioned numerical control function. First and second control flags (flip-flop circuits) CF 102 and CF 104, an address bus gate G 106, a data bus gate G 108 and a random access memory RAM 110 are interconnected between the first and second microprocessors MPU 10a and MPU 100. The second control flag CF 104 is kept set to apply a busy signal to the first microprocessor MPU 10a while the second microprocessor MPU 100 controls the machine tool 20 in accordance wtih an NC program stored in the random access memory RAM 110. During this time, the address and data bus gates G 106 and G 108 enable the second microprocessor MPU 100 to obtain access to the random access memory RAM 110. The first microprocessor MPU 10a, in the absence of a busy signal from the second control flag CF 104, is able to respond to an NC program transfer command input from the key board 11 and sets the first control flag CF 102. This flag CF 102, when set, enables the first microprocessor MPU 10a to get access to the random access memory RAM 110, during which time the NC program stored in the random access memory RAM 10c is read out and transferred block by block to the random access memory RAM 110.

FIG. 14 shows an NC program transfer routine that the first microprocessor MPU 10a executes in response to the NC program transfer command. Step 90 is first executed, and when the second control flag CF 104 is confirmed to have been reset, steps 91-95 are executed thereafter. In these steps, the first microprocessor MPU 10a sets the first control flag CF 102, reads out the NC program block by block from the random access memory RAM 10c and transfers it to the random access memory RAM 110. The microprocessor MPU 10a successively designates addresses of the random access memories RAM 10c and RAM 110, whereby the NC program stored in a designated address area of the random access memory RAM 10c is read out and stored in a designated address area of the random access memory RAM 110. When a last data block is read out and transferred to the random access memory RAM 110, the end of the NC program is confirmed. The first microprocessor MPU 10a thus resets the first control flag CF 102, so that the second microprocessor MPU 100 is enabled to fetch the newly transferred NC program from the random access memory RAM 110.

FIG. 15 shows an NC execution routine that the second microprocessor MPU 100 executes in response to the machining start command. The microprocessor MPU 110, when receiving the machining start command, sets the second control flag CF 104 in step 80 to apply the busy signal to the first microprocessor MPU 10a, and after confirming an end of the NC program in step 82, resets the second control flag CF 104 in step 89. In advance of the NC program transfer from the random access memory RAM 10c to the random access memory RAM 100, the first microprocessor MPU 10a prepares the NC program in the above-described manner and stores it in the random access memory RAM 10c. After the NC program transfer, the second microprocessor MPU 100 reads out the NC program block by block from the random access memory RAM 110 and controls the machine tool 20 in accordance with each read-out NC data block.

Although the above-described embodiments use a rectangular parallelepiped and a circular cylinder to define a basic blank shape and also use a rectangular parallelepiped, a circular cylinder, a round hole and a square hole to define an additional blank shape, it is to be noted however that other shape elements may be used to define the basic blank shape and the additional blank shape.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A machining information input method for use in a machine tool numerical controller which enables an operator to input in a conversational mode machining information necessary for machining a workpiece, said method comprising:
   a first input step of inputting blank shape information defining the blank shape and dimension of said workpiece;
   a second input step of inputting machining definition information defining a number of machining positions on said workpiece and the dimensions of finished shapes to be made respectively at said number of said machining positions; and
   a display step of visibly displaying said blank shape of said workpiece input in said first input step and said finished shapes input in said second input step in such a manner that said finished shapes are superposed on said blank shape of said workpiece in the same ratio and that said operator is able to recognize the blank shape and the finished shapes in three dimensions;
   wherein said first input step includes:
   a shape definition step of inputting shape designation data defining a combination of one of a plurality of basic blank shapes with at least one of a plurality of additional blank shapes; and
   a dimension definition step of inputting dimension data defining the dimensions of said one of said basic blank shapes and said at least one of said additional blank shapes and the position of said at least one of said additional blank shapes relative to said one of said basic blank shapes.

2. A machining information input method as set forth in claim 1, wherein said shape definition step includes:
   a basic menu display and selection step of visibly displaying said plurality of said basic blank shapes and of directing said operator to select one of said basic blank shapes;
   an additional menu display and selection step of visibly displaying said plurality of said additional blank shapes and of directing said operator to select one of said additional blank shapes; and
   a recognition step of recognizing a selected one of said basic blank shapes and a selected one of said additional blank shapes based upon selection command data input by said operator.

3. A machining information input method as set forth in claim 1, wherein:
   said plurality of said basic blank shapes includes a rectangular parallelepiped and a circular cylinder; and
   said plurality of said additional blank shapes includes a rectangular parallelepiped, a circular cylinder, a square hole and a round hole.

4. A machining information input method as set forth in claim 1, wherein:
   said display step includes visibly displaying plan and elevational views of said blank shape of said workpiece and said finished shapes superposed on said blank shape.

5. A machining information input apparatus for a machining tool numerical controller which enables an operator to input in a conversational mode machining information necessary for machining a workpiece, said apparatus comprising:
   data means manually operable for inputting necessary data;
   a display device having a display screen for visibly displaying various data and shape images;
   a data storage means for storing a system control program and other data;
   a data processor connected to said data input means, said display device and said data storage means and responsive to said system control program and other data stored in said data storage means for executing the following steps of:
   displaying on said display screen first information for directing said operator to input blank shape information defining the blank shape and dimension of said workpiece to be machined;
   storing in said data storage means said blank shape information when said operator inputs the same by manually operating said input means in response to said first information displayed on said display screen;
   displaying on said display screen second information for directing said operator to input machining definition information defining a number of machining positions on said workpiece and the dimensions of finished shapes to be made respectively at said machining positions;

storing in said data storage means said machining definition information when said operator inputs the same by manually operating said data input means in response to said second information displayed on said display screen; and displaying on said display screen said blank shape of said workpiece and said finished shapes in such a manner that said finished shapes are superposed on said blank shape of said workpiece in the same scale ratio and that said operator is able to recognize said blank shape and said finished shapes in three dimensions, based upon said blank shape information and said machining definition information stored in said storage means;

wherein said data processor in said step of displaying said first information executes steps of:

displaying on said display screen a plurality of basic blank shapes along with a first message directing said operator to select one of said basic blank shapes; and displaying on said display screen a plurality of additional blank shapes along with a second message directing said operator to select one of said additional blank shapes.

6. A machining information input apparatus as set forth in claim 5, wherein said data processor in said step of storing said blank shape information executes steps of:

storing in said data storage means first shape data input by said operator to select one of said basic blank shapes on said display screen in response to said first message on said display screen; and storing in said data storage means second shape data input by said operator to select one of said additional blank shapes on said display screen in response to said second message on said display screen.

7. A machining information input apparatus as set forth in claim 6, wherein said data processor in said step of displaying said first information further executes steps of:

displaying on said display screen said selected one of said basic blank shapes along with a third message directing said operator to designate the dimension of said selected one of said basic blank shapes; and displaying on said display screen said selected one of said additional blank shapes along with a fourth message directing said operator to designate the dimension of said selected one of said additional blank shapes and the position of said selected one of said additional blank shapes relative to said selected one of said basic blank shapes.

8. A machining information input apparatus as set forth in claim 7, wherein said data processor in said step of storing said blank shape information further executes steps of:

storing in said data storage means first dimension data input by said operator to designate the dimension of said selected one of said basic blank shapes in response to said third message on said display screen; and storing in said data storage means second dimension data input by said operator to designate the dimension and position of said selected one of said additional blank shapes in response to said fourth message on said display screen.

9. A machining information input apparatus as set forth in claim 8, wherein;

said data processor is responsive to said first and second shape data and said first and second dimension data stored in said data storage means for displaying on said display screen a combination of said selected one of said basic blank shapes and said selected one of said additional blank shapes with dimensions designated by said first and second dimension data.

10. A machining information input apparatus as set forth in claim 5, wherein:

said data processor in said step of displaying said blank shape of said workpiece and said finished shapes controls said display, device to generate on said display screen at least two different views each illustrating said blank shape and said finished shapes which are superposed on said blank shape in the same scale ratio.

* * * * *